UNITED STATES PATENT OFFICE.

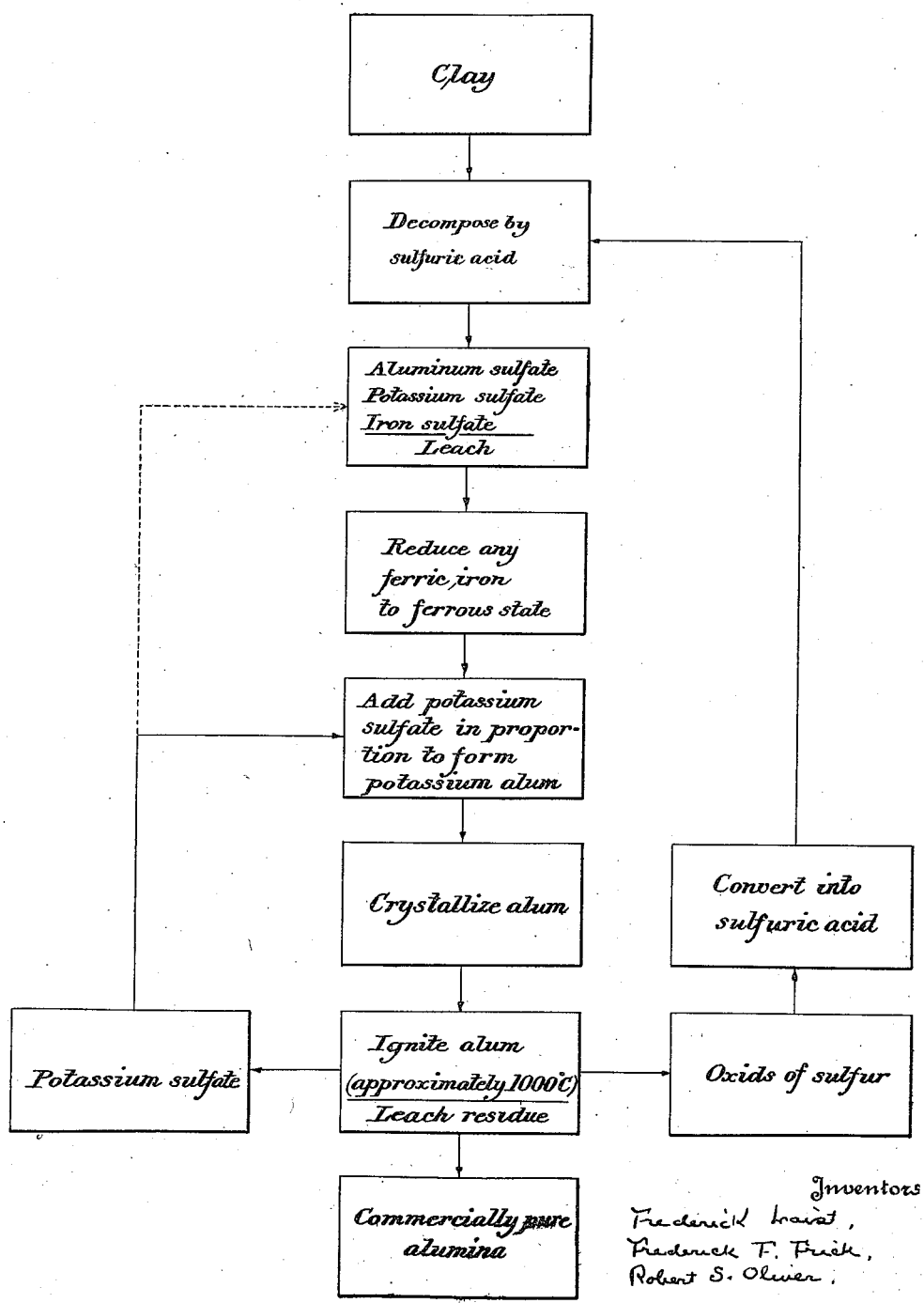

FREDERICK LAIST, FREDERICK F. FRICK, AND ROBERT S. OLIVER, OF ANACONDA, MONTANA, ASSIGNORS TO ANACONDA COPPER MINING COMPANY, OF ANACONDA, MONTANA, A CORPORATION OF MONTANA.

PROCESS OF PREPARING ALUMINA.

1,300,417.            Specification of Letters Patent.      Patented Apr. 15, 1919.

Application filed April 10, 1918. Serial No. 227,722.

*To all whom it may concern:*

Be it known that we, (1) FREDERICK LAIST, (2) FREDERICK F. FRICK, and (3) ROBERT S. OLIVER, citizens of the United States, residing at Anaconda, in the county of Deerlodge and State of Montana, have invented certain new and useful Improvements in Processes of Preparing Alumina, of which the following is a specification.

This invention is a process applicable to the preparation of commercially pure alumina, particularly from clays or equivalent silicates of aluminum. Clay is essentially a more or less impure aluminum silicate, generally mixed with some quartz. Clay to be treated in accordance with this process should preferably be reasonably low in iron, calcium and magnesium. Potassium may or may not be present.

The process in its preferred embodiment is cyclical in character, and is indicated in the accompanying drawing, which is a diagram in the form of a flow sheet of the process. The operation thus indicated is as follows:—

The clay is first mixed with concentrated sulfuric acid, and the mixture is heated to 300°–400° centigrade in order to decompose the aluminum silicate, as well as potassium silicate, if present. This reaction results in the formation of aluminum and potassium sulfates, more or less sulfate of iron being likewise produced. The soluble sulfates are now extracted by means of hot water, or a solution of potassium sulfate, and any ferric iron in the resulting solution is reduced to the ferrous state by means of metallic aluminum, metallic iron, sulfur dioxid, or other appropriate reducing agent.

The solution which now contains essentially aluminum sulfate, ferrous sulfate, and possibly potassium sulfate, is filtered from the residue which consists chiefly of silica. The clear solution is mixed hot with sufficient potassium sulfate (unless this has been added to the leaching solution) to form potassium alum by reaction with all of the aluminum sulfate contained in the solution. Preferably the solution is then cooled as rapidly as possible, and is stirred while cooling in order that the resulting crystals of potassium alum may be of small size. The precipitate formed under these conditions is similar in appearance to granulated sugar. This is however merely a preferable mode of procedure: For example, the solution may be run into ponds or other crystallizing system where the cooling will take place slowly, in which case the crystals will be large in size. The crystals obtained by the method first described are somewhat purer than those obtained by the latter method.

If the iron in the original solution has been completely reduced to the ferrous state before the addition of potassium sulfate, the resulting alum will be remarkably free from iron. This is highly important, especially in case the aluminum oxid eventually produced is to be used for the manufacture of metallic aluminum. By proceeding in the manner first above described, we have succeeded in preparing from ordinary clay aluminum oxid of which the iron content does not exceed 0.10 per cent.

The alum is now dried and ignited to a temperature approximating 1000° C. The ignition is preferably carried on in a furnace similar to a by-product coke oven, or in an electric furnace; that is to say in such type of furnace that fire gases do not become mixed with the gaseous products from the decomposition of the alum. This is for the reason that the process contemplates the conversion of such gaseous products of decomposition, comprising sulfur trioxid, sulfur dioxid and oxygen, into sulfuric acid; and the production of sulfuric acid is much simpler when the gases are relatively pure. It is understood, however, that the ignition may be carried on in oil or gas-fired furnaces of any type.

We have found that under the preferred operating conditions approximately 20 per cent. of the sulfuric acid combined with the aluminum is expelled in the form of sulfur trioxid ($SO_3$). This may be separated from the mixture of sulfur dioxid and oxygen by any appropriate method, such as electrostatic precipitation, or absorption in concentrated sulfuric acid. The sulfur dioxid may likewise be converted into sulfuric acid in accordance with the well known methods. The sulfuric acid thus produced is applied to the treatment of a fresh batch of clay in a repetition of the process.

The solid residue remaining after the ignition of the alum is essentially a mixture of aluminum oxid and potassium sulfate. This mixture is leached with water. The residue consists of commercially pure aluminum oxid, and after drying is ready for use in the production of metallic aluminum, or for any other purpose for which commercially pure aluminum oxid is required. The solution of potassium sulfate is either used direct for leaching fresh batches of sulfated clay or is evaporated, and the potassium sulfate is returned to the cyclical process at the appropriate stage for the precipitation of alum from fresh batches of aluminum sulfate.

In case the clay contains potassium there will be a corresponding accumulation of potassium sulfate, which may of course be marketed or disposed of in any desired manner.

In so far as sulfates of the other alkali metals may be capable of replacing potassium sulfate in this reaction they are to be regarded as equivalent thereto for the purposes of this invention.

It is obvious that the process above described as applicable to the preparation of alumina from clay, is equally applicable to the preparation of alumina from aluminum sulfate from any source, including alunite or the like.

We claim :—

1. A cyclical process of producing commercially pure alumina from aluminous raw materials, comprising treating the aluminous material with sulfuric acid in proportion sufficient to convert the bases into sulfates, and dissolving the same; reducing any ferric iron to the ferrous state; adding to the solution potassium sulfate in proportion to convert the aluminum sulfate into potassium alum; crystallizing the alum and igniting the same at a sufficient temperature to produce alumina, potassium sulfate, and oxids of sulfur; recovering the alumina; and returning the potassium sulfate to the process at the appropriate stage for producing with aluminum sulfate additional quantities of potassium alum.

2. A cyclical process of producing commercially pure alumina from aluminous raw materials, comprising treating the aluminous material with sulfuric acid in proportion sufficient to convert the bases into sulfates, and dissolving the same; reducing any ferric iron to the ferrous state; adding to the solution potassium sulfate in proportion to convert the aluminum sulfate into potassium alum; crystallizing the alum and igniting the same at a sufficient temperature to produce alumina, potassium sulfate, and oxids of sulfur; recovering the alumina; returning the potassium sulfate to the process at the appropriate stage for producing with aluminum sulfate additional quantities of potassium alum; and converting the oxids of sulfur into sulfuric acid applicable for use in the treatment of further quantities of the aluminous raw material.

3. In a process of preparing commercially pure alumina from aluminous raw materials, the steps which consist in converting the alumina component of the raw material into aluminum sulfate; reacting thereon with potassium sulfate to produce potassium alum; and recovering potassium sulfate and commercially pure alumina from the alum thus produced.

4. In a cyclical process of preparing commercially pure alumina from aluminum sulfate, the steps which consist in reacting upon aluminum sulfate in aqueous solution wit'. potassium sulfate to produce potassium alum; decomposing the alum by heat to produce commercially pure alumina and potassium sulfate; and utilizing the recovered potassium sulfate in a repetition of the process.

5. In a cyclical process of preparing commercially pure alumina from aluminum sulfate contaminated by ferric iron, the steps which consist in reducing the ferric iron to the ferrous state; treating the resulting aluminum sulfate in aqueous solution with potassium sulfate in proportion to produce potassium alum; crystallizing and recovering the alum and decomposing the same by heat to produce commercially pure alumina and potassium sulfate; and utilizing the recovered potassium sulfate in a repetition of the process.

In testimony whereof, we affix our signatures.

FREDERICK LAIST.
FREDERICK F. FRICK.
ROBERT S. OLIVER.